Figure 1:
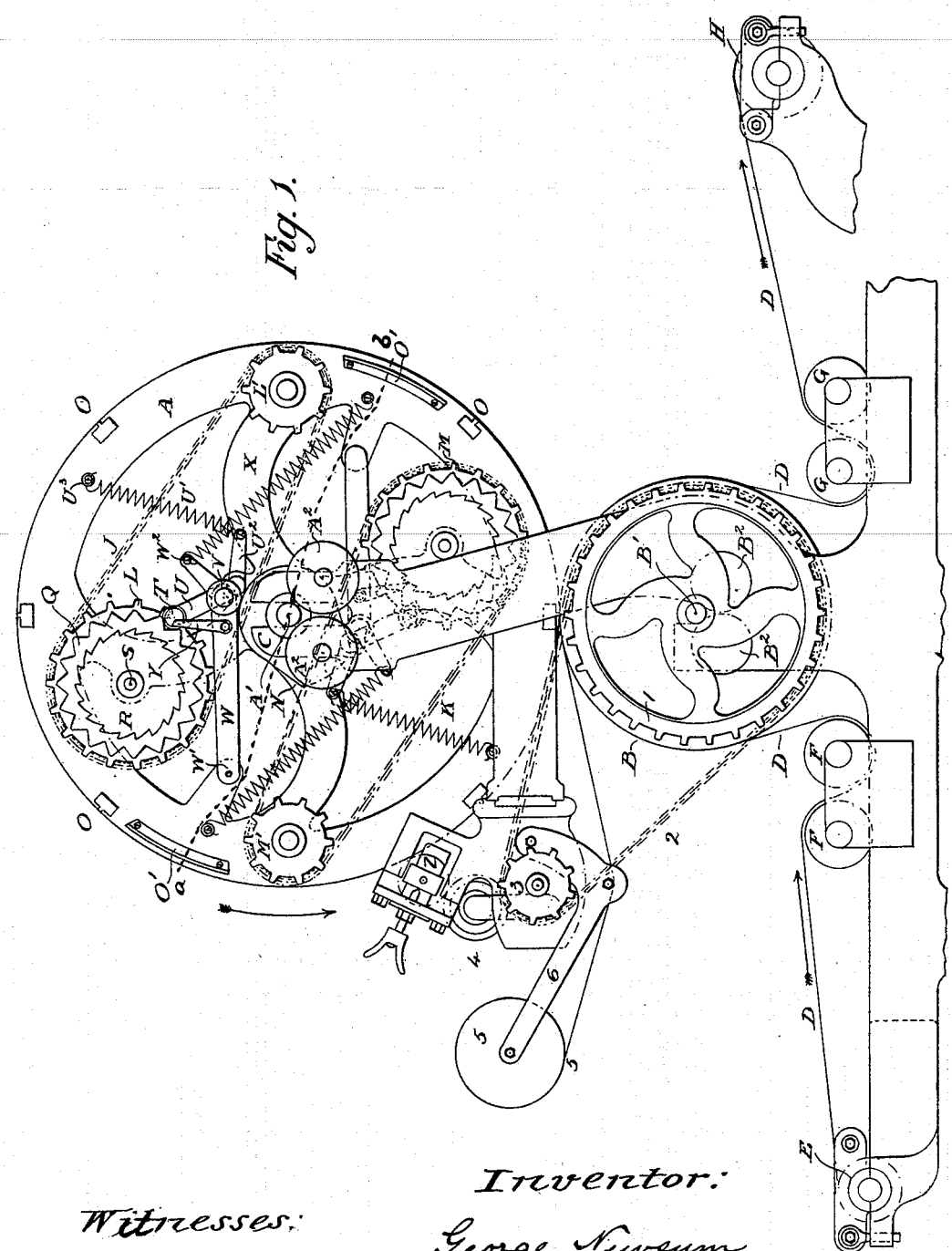

No. 615,406. Patented Dec. 6, 1898.
G. NEWSUM.
APPARATUS FOR MEASURING AND MARKING LENGTHS ON FABRICS.
(Application filed Oct. 8, 1897.)
(No Model.) 3 Sheets—Sheet 1.

Witnesses:
E. R. Bolton
O. Dunn

Inventor:
George Newsum
By Richards
his Attorneys.

No. 615,406. Patented Dec. 6, 1898.
G. NEWSUM.
APPARATUS FOR MEASURING AND MARKING LENGTHS ON FABRICS.
(Application filed Oct. 8, 1897.)
(No Model.) 3 Sheets—Sheet 2.
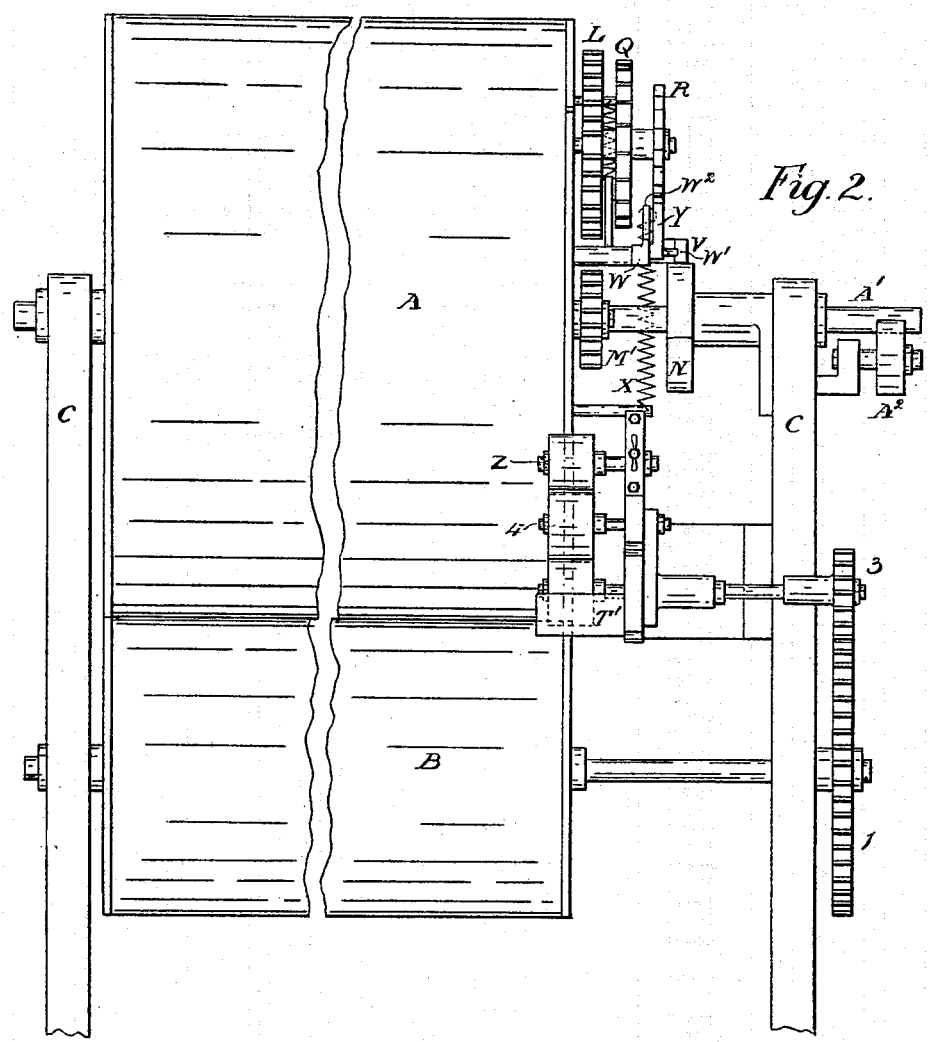
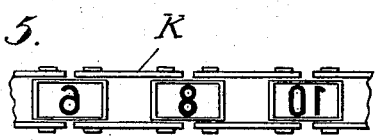
Witnesses:
E. B. Bolton
Inventor:
George Newsum
By Richards
his Attorneys.

No. 615,406. Patented Dec. 6, 1898.
G. NEWSUM.
APPARATUS FOR MEASURING AND MARKING LENGTHS ON FABRICS.
(Application filed Oct. 8, 1897.)
(No Model.) 3 Sheets—Sheet 3.
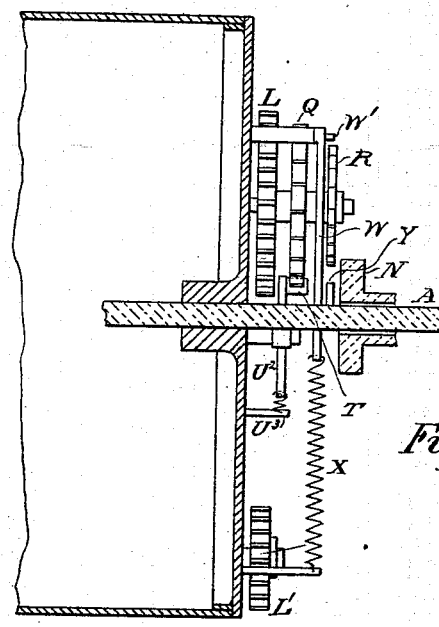
Fig. 7.
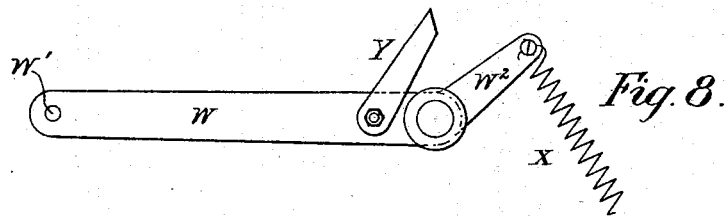
Fig. 8.
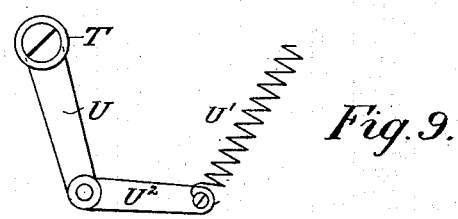
Fig. 9.
Witnesses:
Inventor:
George Newsum
By 
his Attorneys.

UNITED STATES PATENT OFFICE.

GEORGE NEWSUM, OF LEEDS, ENGLAND.

APPARATUS FOR MEASURING AND MARKING LENGTH ON FABRICS.

SPECIFICATION forming part of Letters Patent No. 615,406, dated December 6, 1898.

Application filed October 8, 1897. Serial No. 654,589. (No model.)

*To all whom it may concern:*

Be it known that I, GEORGE NEWSUM, a subject of the Queen of Great Britain and Ireland, residing at Leeds, in the county of York, England, have invented certain Improvements in Apparatus for Measuring and Marking the Length on Fabrics and Like Materials, (for which I have obtained a patent in Great Britain, No. 26,111, dated November 19, 1896,) of which the following is a specification.

This invention relates to certain improvements in mechanism arranged so as to automatically measure and register on fabrics and like material the length of same and to divide each standard of length marked thereon into any number of divisions, as may be required; also, to provide means for imparting at intervals on the fabric or the like a trade-mark or other device.

In describing my invention in detail reference is made to the accompanying sheets of drawings, in which—

Figure 1 represents an end elevation showing the main features of the machine. Fig. 2 represents a front elevation of the upper portions of a machine constructed according to my invention. Part of the wheels and levers are omitted therefrom and also the web of paper and support hereinafter described for the purpose of more clearly showing and describing my invention. Figs. 3 and 4 are detached detail views of the chains carrying the odd numerals drawn to a larger scale. Figs. 5 and 6 are similar views of chains carrying the even numerals. Fig. 7 is a sectional elevation through irregular line $a\,b$ in Fig. 1, and Figs. 8 and 9 are detached details of the levers for operating and retaining the chains and wheels connected therewith in the required position.

In carrying out my improvements I construct a machine provided with two cylinders A and B, the relative circumferences of which are by preference covered with soft material and in the ratio of two to one—that is to say, the cylinder B is one yard in circumference and cylinder A two yards. The cylinders are mounted on the axles A' and B', the latter being supported by the antifriction-rollers $B^2$. The periphery of the cylinder A rests upon that of the cylinder B, and the axle A' of cylinder A projects through the forked opening in top of side bracket C, which may be fitted with antifriction-rollers $A^2$, adjusted to be in contact with the axle A'.

The cloth or the like D to be measured and marked may be wrapped upon a roller E (shown by dotted lines) and conducted in the direction of the arrows over and under the guide-rollers F F to the cylinder B, around a portion of the circumference of which it is carried, then passing over and under guide-rollers G G to the rotating roller H (also shown by dotted lines) and driven in any convenient manner. The travel of the cloth or the like over the cylinder B and between the cylinders A and B causes them to rotate.

The mechanism is arranged so as to print on the outside or selvage of the cloth or the like and is placed at one end of the large cylinder A in a manner so as to rotate therewith. The figures for marking the cloth are secured on two endless chains J and K, one chain carrying the even numbers and the other the odd numbers.

The chain J, carrying the odd numbers, is mounted upon the sprocket-wheels L and L' and chain K, carrying the even numbers, upon sprocket-wheels M and M', around which they are rotated intermittently by means of pawls operated by a stationary cam N, secured to one of the side frames C, the endless chains J and K being moved the space from one figure or set of figures to another at each revolution of the cylinder A.

The figures are arranged on the respective chains to stand prominent with the face or periphery of the cylinder A when the figure or figures is or are passing over the periphery of the bottom cylinder B as the said cylinders revolve. Provision is made for inking the figures and the fractional divisions of lengths or other distinctive marks which may be secured to the cylinder A at O and O'.

The mechanism for supporting and operating the two endless chains J and K is the same, and in describing the operation of the machine reference is made to one set of chains—that is, to one marking device only, as a description of the other marking device would be a repetition.

The sprocket-wheel L, wheel Q, and ratchet-wheel R are secured together and mounted upon a stud S as axle, secured to the end of cylinder A, and by the movement of the wheel Q the distance of one tooth the sprocket-wheel L and endless chain J are moved the distance from one block of numerals to the next, the wheels L, Q, and R being then locked in position during the printing operation by a small roller T, mounted to one end of bell-crank lever U, supported by a pin attached to the end of cylinder A. The roller T engages in a space between the teeth of the wheel Q when the wheels are at rest and is held in contact with the said wheel by a spiral spring U' in tension, coupled to the other arm $U^2$ of said bell-crank lever and to a stud $U^3$, attached to the end of cylinder A.

The change from one numeral to another is effected in the following manner: The small roller V, mounted near to one end of the lever W, carried by a stud W', attached to the end of cylinder A, is kept in contact with the periphery of the stationary cam N by the tension of the spiral spring X, attached to the arm $W^2$ of lever W, and on the cylinder A rotating the small roller V passes over the periphery of the stationary cam N, and on coming to the projecting portion of the said cam the small roller V and lever W are moved some distance away from the axle A' in the direction for bringing the pawl Y, attached to the lever W, into contact with the teeth of the ratchet-wheel R, thereby turning the wheel R and the wheels Q, L, and L' the distance of a tooth—that is, from one figure-block to another—the spring U allowing the roller T to ride over the point of the tooth with which it is in contact and engage in the next space for holding the wheels and chain in their required position during the marking. This operation is repeated in connection with the mechanism of each endless chain at every revolution of the cylinder A, one series of figures on the endless chain J marking the odd numbers and the other series on the endless chain K marking the even numerals, the figures projecting from the endless chains sufficiently beyond the periphery of the cylinder A to mark the cloth traveling between the two cylinders.

The inking of the figures on the endless chains J and K and the fractional parts or other devices attached to the cylinder at O and O' is accomplished by the roller Z, operated and supplied with ink in the following manner.

On the axis of the smaller cylinder B is secured a sprocket-wheel 1, connected by a chain 2 with the sprocket-wheel 3, upon the axle of which is a roller partly immersed in ink in a suitable trough T'. The ink collected by the said roller is transferred by the roller 4, running in contact therewith, to the inking-roller Z and by the latter to the figures or the like as they pass over the said roller.

In place of the marking being impressed direct upon the cloth, as described, it may be accomplished by impressing the figures upon a web of paper 5, which may be mounted upon a detachable bracket 6, the web of paper being conducted from the roll to between the cylinders A and B in any convenient manner and, passing along with the cloth, is marked and wrapped or folded with the cloth around a roller or board, as the case may be.

What I claim as my invention is—

1. In a measuring and marking machine, a pair of cylinders A and B between which the material to be marked passes, a pair of sprockets journaled upon the end of one of said cylinders, a sprocket-chain passing over said wheels and carrying printing-type faces, a spur-wheel and a ratchet-wheel rigidly connected with one of said sprocket-wheels, a yielding pawl engaging the teeth of said spur-wheel, a spring-pressed lever carrying a pawl adapted to engage the teeth of the ratchet-wheel, and a stationary cam arranged to co-act with said lever, substantially as described.

2. In a measuring and marking machine, a pair of cylinders between which the material to be measured passes, a pair of sprocket wheels journaled upon axles carried by one of said cylinders, said axles being parallel with the axis of the roller, a sprocket-chain passing over said wheels and carrying printing-type, a spur-wheel and a sprocket-wheel rigidly connected with one of said sprocket-wheels, a spring-pressed arm carrying a roller arranged to engage said spur-wheel, an arm W carrying a pawl arranged to engage the ratchet-wheel, and a stationary cam arranged to operate said arm W, substantially as described.

In testimony whereof I have signed my name to this specification in the presence of two subscribing witnesses.

G. NEWSUM.

Witnesses:
B. H. MALLINSON,
H. S. RUSHFORTH.